(12) United States Patent
Othmer

(10) Patent No.: US 8,219,926 B2
(45) Date of Patent: *Jul. 10, 2012

(54) DISPLAYING A MAP ON A HANDHELD WIRELESS TELECOMMUNICATION DEVICE

(75) Inventor: Konstantin Othmer, Mountain View, CA (US)

(73) Assignee: Smith Micro Software, Inc, Aliso Viejo, CA (US)

( * ) Notice: Subject to any disclaimer, the term of this patent is extended or adjusted under 35 U.S.C. 154(b) by 60 days.

This patent is subject to a terminal disclaimer.

(21) Appl. No.: 12/825,154

(22) Filed: Jun. 28, 2010

(65) Prior Publication Data

US 2010/0269028 A1 Oct. 21, 2010

Related U.S. Application Data

(63) Continuation of application No. 12/045,603, filed on Mar. 10, 2008, now Pat. No. 7,747,962, which is a continuation of application No. 11/298,818, filed on Dec. 9, 2005, now Pat. No. 7,343,564, which is a continuation-in-part of application No. 10/916,960, filed on Aug. 11, 2004, now abandoned.

(60) Provisional application No. 60/494,644, filed on Aug. 11, 2003.

(51) Int. Cl.
*G06F 3/048* (2006.01)
*G06F 17/00* (2006.01)

(52) U.S. Cl. ........ 715/774; 715/765; 715/781; 715/864; 345/169; 340/995.1; 340/995.15; 701/412

(58) Field of Classification Search .................. 715/700, 715/705, 708, 733, 760, 764, 765, 774, 781, 715/809, 835, 839, 864, 205; 701/200, 201, 701/207, 213, 214; 719/328, 329; 340/990, 340/995.1, 995.15, 995.17, 995.19; 345/169
See application file for complete search history.

(56) References Cited

U.S. PATENT DOCUMENTS

| 3,824,597 A | 7/1974 | Berg |
| 5,321,750 A | 6/1994 | Nadan |
| 5,652,615 A | 7/1997 | Bryant et al. |
| 5,801,747 A | 9/1998 | Bedard |

(Continued)

FOREIGN PATENT DOCUMENTS

EP 1195949 A2 10/2002

(Continued)

OTHER PUBLICATIONS

U.S. Appl. No. 10/916,960, filed Aug. 11, 2004, Othmer et al.

(Continued)

*Primary Examiner* — Xiomar L Bautista
(74) *Attorney, Agent, or Firm* — Workman Nydegger

(57) ABSTRACT

Tickers are populated with location-based information that is selected according to the geographic location of communication devices. The location of a communication device is identified based on a GPS system, proximity to transmitters in a wireless network, user input, or using other techniques. Location-appropriate content is obtained either in real-time from the network or from a local data store at the communication device. In general location-based, context-aware content can be displayed on tickers associated with a variety of communication devices, including mobile communication devices and "immobile" or stationary personal computers. When a ticker item is selected from the ticker, a location associated with the selected ticker item and/or a location of the communication device is used to generate a map that is displayed on the display of the device to the user.

28 Claims, 8 Drawing Sheets

U.S. PATENT DOCUMENTS

| | | | |
|---|---|---|---|
| 5,875,232 A | 2/1999 | Wolf |
| 5,875,240 A | 2/1999 | Silverman |
| 5,948,061 A | 9/1999 | Merriman et al. |
| 5,959,621 A | 9/1999 | Nawaz et al. |
| 5,978,013 A | 11/1999 | Jones et al. |
| 6,016,307 A | 1/2000 | Kaplan et al. |
| 6,028,842 A | 2/2000 | Chapman et al. |
| 6,069,648 A | 5/2000 | Suso et al. |
| 6,085,148 A | 7/2000 | Jamison et al. |
| 6,091,947 A | 7/2000 | Sumner |
| 6,091,956 A | 7/2000 | Hollenberg |
| 6,130,933 A | 10/2000 | Miloslavsky |
| 6,138,162 A | 10/2000 | Pistriotto et al. |
| 6,144,641 A | 11/2000 | Kaplan et al. |
| 6,151,030 A | 11/2000 | DeLeeuw et al. |
| 6,157,614 A | 12/2000 | Pasternak et al. |
| 6,157,935 A | 12/2000 | Tran et al. |
| 6,173,311 B1 | 1/2001 | Hassett et al. |
| 6,177,931 B1 | 1/2001 | Alexander et al. |
| 6,181,780 B1 | 1/2001 | Finnigan |
| 6,216,006 B1 | 4/2001 | Scholefield et al. |
| 6,216,129 B1 | 4/2001 | Eldering |
| 6,219,341 B1 | 4/2001 | Varanasi |
| 6,240,361 B1 | 5/2001 | Ise |
| 6,249,576 B1 | 6/2001 | Sassin et al. |
| 6,263,505 B1 | 7/2001 | Walker et al. |
| 6,268,857 B1 | 7/2001 | Fishkin et al. |
| 6,285,658 B1 | 9/2001 | Packer |
| 6,292,799 B1 | 9/2001 | Peek et al. |
| 6,300,875 B1 | 10/2001 | Schafer |
| 6,310,889 B1 | 10/2001 | Parsons et al. |
| 6,324,184 B1 | 11/2001 | Hou et al. |
| 6,324,271 B1 | 11/2001 | Sawyer et al. |
| 6,385,449 B2 | 5/2002 | Eriksson et al. |
| 6,397,059 B1 | 5/2002 | Vance et al. |
| 6,401,238 B1 | 6/2002 | Brown et al. |
| 6,421,694 B1 | 7/2002 | Nawaz et al. |
| 6,453,351 B1 | 9/2002 | Endo |
| 6,456,594 B1 | 9/2002 | Kaplan et al. |
| 6,466,202 B1 | 10/2002 | Suso et al. |
| 6,473,404 B1 | 10/2002 | Kaplan et al. |
| 6,477,707 B1 | 11/2002 | King et al. |
| 6,519,771 B1 | 2/2003 | Zenith |
| 6,522,342 B1 | 2/2003 | Gagnon et al. |
| 6,522,875 B1 | 2/2003 | Dowling et al. |
| 6,526,275 B1 | 2/2003 | Calvert |
| 6,536,041 B1 | 3/2003 | Knudson et al. |
| 6,538,880 B1 | 3/2003 | Kamijo et al. |
| 6,542,721 B2 | 4/2003 | Boesen |
| 6,546,390 B1 | 4/2003 | Pollack et al. |
| 6,567,984 B1 | 5/2003 | Allport |
| 6,594,483 B2 | 7/2003 | Nykanen et al. |
| 6,637,029 B1 | 10/2003 | Maissel et al. |
| 6,640,239 B1 | 10/2003 | Gidwani |
| 6,668,353 B1 | 12/2003 | Yurkovic |
| 6,675,350 B1 | 1/2004 | Abrams et al. |
| 6,708,335 B1 | 3/2004 | Ozer et al. |
| 6,727,930 B2 | 4/2004 | Currans et al. |
| 6,731,238 B2 | 5/2004 | Johnson |
| 6,742,042 B1 | 5/2004 | Orton et al. |
| 6,757,718 B1 | 6/2004 | Halverson et al. |
| 6,771,290 B1 | 8/2004 | Hoyle |
| 6,788,314 B1 | 9/2004 | Freiberger et al. |
| 6,859,197 B2 | 2/2005 | Klein et al. |
| 6,966,028 B1 | 11/2005 | Beebe |
| 7,013,149 B2 | 3/2006 | Vetro et al. |
| 7,035,170 B2 | 4/2006 | Narayanaswami et al. |
| 7,039,684 B2 | 5/2006 | Blockton et al. |
| 7,136,871 B2 | 11/2006 | Ozer et al. |
| 7,155,510 B1 | 12/2006 | Kaplan |
| 7,167,728 B1 | 1/2007 | Wagner et al. |
| 7,177,859 B2 | 2/2007 | Pather et al. |
| 7,343,564 B2 | 3/2008 | Othmer |
| 7,370,283 B2 | 5/2008 | Othmer |
| 7,412,236 B1 | 8/2008 | Blight et al. |
| 7,430,724 B2 | 9/2008 | Othmer et al. |
| 7,441,203 B2 | 10/2008 | Othmer et al. |
| 7,747,962 B2 | 6/2010 | Othmer |
| 7,747,963 B2 | 6/2010 | Othmer et al. |
| 2001/0013068 A1 | 8/2001 | Klemets et al. |
| 2001/0051998 A1 | 12/2001 | Henderson |
| 2001/0056443 A1 | 12/2001 | Takayama et al. |
| 2002/0004755 A1 | 1/2002 | Balthaser |
| 2002/0010928 A1 | 1/2002 | Sahota |
| 2002/0046104 A1 | 4/2002 | Kaddeche et al. |
| 2002/0053078 A1 | 5/2002 | Holtz et al. |
| 2002/0083093 A1 | 6/2002 | Goodisman et al. |
| 2002/0087649 A1 | 7/2002 | Horvitz |
| 2002/0094826 A1 | 7/2002 | Lee |
| 2002/0103781 A1 | 8/2002 | Mori et al. |
| 2002/0145666 A1 | 10/2002 | Scaman et al. |
| 2002/0151313 A1 | 10/2002 | Stead |
| 2002/0163547 A1 | 11/2002 | Abramson et al. |
| 2002/0163938 A1 | 11/2002 | Tuomainen et al. |
| 2002/0164977 A1 | 11/2002 | Link, II et al. |
| 2002/0166127 A1 | 11/2002 | Hamano et al. |
| 2002/0178447 A1 | 11/2002 | Plotnick et al. |
| 2002/0193095 A1 | 12/2002 | Hutcheson et al. |
| 2002/0194049 A1 | 12/2002 | Boyd |
| 2002/0194601 A1 | 12/2002 | Perkes et al. |
| 2003/0003929 A1 | 1/2003 | Himmel et al. |
| 2003/0026231 A1 | 2/2003 | Lazaridis et al. |
| 2003/0032404 A1 | 2/2003 | Wager et al. |
| 2003/0034957 A1 | 2/2003 | Dubil et al. |
| 2003/0045245 A1 | 3/2003 | Hikishima |
| 2003/0045273 A1 | 3/2003 | Pyhalammi et al. |
| 2003/0063128 A1 | 4/2003 | Salmimaa et al. |
| 2003/0069693 A1 | 4/2003 | Snapp et al. |
| 2003/0093495 A1 | 5/2003 | McNulty et al. |
| 2003/0110503 A1 | 6/2003 | Perkes et al. |
| 2003/0135582 A1 | 7/2003 | Allen et al. |
| 2003/0142129 A1 | 7/2003 | Kleven et al. |
| 2003/0164779 A1 | 9/2003 | Gieseke et al. |
| 2003/0164862 A1 | 9/2003 | Cadiz et al. |
| 2003/0167467 A1 | 9/2003 | Allen et al. |
| 2003/0171985 A1 | 9/2003 | Prabhu et al. |
| 2003/0181228 A1 | 9/2003 | Kim |
| 2003/0182435 A1 | 9/2003 | Redlich et al. |
| 2003/0189557 A1 | 10/2003 | Takagi et al. |
| 2003/0220835 A1 | 11/2003 | Barnes, Jr. |
| 2003/0220866 A1 | 11/2003 | Pisaris-Henderson et al. |
| 2003/0226152 A1 | 12/2003 | Billmaier et al. |
| 2004/0003402 A1 | 1/2004 | McKenna, Jr. |
| 2004/0031061 A1 | 2/2004 | McCalla et al. |
| 2004/0059826 A1 | 3/2004 | Gould et al. |
| 2004/0067769 A1 | 4/2004 | King et al. |
| 2004/0073924 A1 | 4/2004 | Pendakur |
| 2004/0078104 A1 | 4/2004 | Nguyen et al. |
| 2004/0078814 A1 | 4/2004 | Allen |
| 2004/0093563 A1 | 5/2004 | Pasquali |
| 2004/0101274 A1 | 5/2004 | Foisy et al. |
| 2004/0103851 A1 | 6/2004 | Hunter |
| 2004/0107439 A1 | 6/2004 | Hassell et al. |
| 2004/0116167 A1 | 6/2004 | Okuzako et al. |
| 2004/0121761 A1 | 6/2004 | Tripathy et al. |
| 2004/0133655 A1 | 7/2004 | Yen et al. |
| 2004/0143636 A1 | 7/2004 | Horvitz et al. |
| 2004/0186733 A1 | 9/2004 | Loomis |
| 2004/0192336 A1 | 9/2004 | Walby |
| 2004/0196265 A1 | 10/2004 | Nohr |
| 2004/0203512 A1 | 10/2004 | Ho et al. |
| 2004/0204122 A1 | 10/2004 | Opela et al. |
| 2004/0205065 A1 | 10/2004 | Petras et al. |
| 2004/0210947 A1 | 10/2004 | Shusman |
| 2004/0233160 A1 | 11/2004 | Chincholle et al. |
| 2005/0005242 A1 | 1/2005 | Hoyle |
| 2005/0022114 A1 | 1/2005 | Shanahan et al. |
| 2005/0032527 A1 | 2/2005 | Sheha et al. |
| 2005/0039135 A1 | 2/2005 | Othmer et al. |
| 2005/0039136 A1 | 2/2005 | Othmer et al. |
| 2005/0086004 A1 | 4/2005 | Smith |
| 2005/0125375 A1 | 6/2005 | Lee et al. |
| 2005/0136949 A1 | 6/2005 | Barnes, Jr. |
| 2005/0140504 A1 | 6/2005 | Marshall et al. |
| 2005/0144065 A1 | 6/2005 | Calabria et al. |
| 2005/0154996 A1 | 7/2005 | Othmer |
| 2005/0210391 A1 | 9/2005 | Othmer |

| | | |
|---|---|---|
| 2005/0235318 A1 | 10/2005 | Grauch et al. |
| 2005/0283792 A1 | 12/2005 | Swix et al. |
| 2006/0010476 A1 | 1/2006 | Kelly et al. |
| 2006/0015891 A1 | 1/2006 | Lazzaro et al. |
| 2006/0022048 A1 | 2/2006 | Johnson |
| 2006/0053392 A1 | 3/2006 | Salmimaa et al. |
| 2006/0089160 A1 | 4/2006 | Othmer |
| 2006/0126556 A1 | 6/2006 | Jiang et al. |
| 2006/0133307 A1 | 6/2006 | Fukasawa et al. |
| 2006/0136965 A1 | 6/2006 | Ellis et al. |
| 2006/0159096 A1 | 7/2006 | Gershinsky et al. |
| 2006/0179415 A1 | 8/2006 | Cadiz et al. |
| 2006/0217110 A1 | 9/2006 | Othmer |
| 2006/0219780 A1 | 10/2006 | Swartz et al. |
| 2006/0229065 A1 | 10/2006 | Lazaridis et al. |
| 2006/0236257 A1 | 10/2006 | Othmer et al. |
| 2006/0236258 A1 | 10/2006 | Othmer et al. |
| 2006/0265637 A1 | 11/2006 | Marriott et al. |
| 2006/0271980 A1 | 11/2006 | Mankovitz |
| 2007/0027753 A1 | 2/2007 | Collins |
| 2007/0050360 A1 | 3/2007 | Hull et al. |
| 2007/0127645 A1 | 6/2007 | Bloebaum et al. |
| 2007/0240181 A1 | 10/2007 | Eldering et al. |
| 2008/0155453 A1 | 6/2008 | Othmer |
| 2009/0077580 A1 | 3/2009 | Konig et al. |
| 2009/0132378 A1 | 5/2009 | Othmer et al. |
| 2010/0269058 A1 | 10/2010 | Othmer et al. |
| 2010/0269059 A1 | 10/2010 | Othmer |

FOREIGN PATENT DOCUMENTS

| | | |
|---|---|---|
| JP | 409311997 | 2/1997 |

OTHER PUBLICATIONS

U.S. Appl. No. 10/917,200, filed Aug. 11, 2004, Othmer et al.
U.S. Appl. No. 12/825,154, filed Jun. 28, 2010, Othmer.
U.S. Appl. No. 12/825,145, filed Jun. 28, 2010, Othmer et al.
U.S. Appl. No. 12/825,151, filed Jun. 28, 2010, Othmer et al.
A. Catovic et al, "Geolocation updating schemes for location aware services in wireless networks", 2001, IEEE, vol. 1, pp. 378-382.
G. G Bieber et al, "XyberScout: a platform for the efficient construction of mobile location aware information systems", Jan. 2003, IEEE.
SCE Students' Applications Won Motorola's Buddy Finder Competition, http://www.ntu.edu.sg/sce/achieves-sch2003-05.asp#2003-11-3; 2003.
S. Kinoshita et al., "RealPush Network: A New Push-Type Content Delivery System Using Reliable and Flexible Browser", 1998, IEEE, pp. 188-189.
NTT, "NTT Develops RealPush Network", Dec. 19, 1997, News Release, 3 pages.
http://communications.georgetown.edu/rss.html; Georgetown University—Newsroom—RSS Feeds, 1999-2003.
U.S. Appl. No. 10/916,960, Mar. 14, 2006, Office Action.
U.S. Appl. No. 10/929,000, Mar. 24, 2006, Office Action.
U.S. Appl. No. 10/946,254, Mar. 24, 2006, Office Action.
U.S. Appl. No. 11/061,422, Jun. 28, 2006, Office Action.
U.S. Appl. No. 10/946,254, Nov. 1, 2006, Office Action.
U.S. Appl. No. 11/061,422, Nov. 1, 2006, Office Action.
U.S. Appl. No. 10/916,960, Dec. 14, 2006, Office Action.
U.S. Appl. No. 10/929,000, Dec. 19, 2006, Office Action.
U.S. Appl. No. 11/090,724, Jan. 11, 2007, Office Action.
U.S. Appl. No. 10/916,960, Mar. 22, 2007, Office Action.
U.S. Appl. No. 10/929,000, Mar. 22, 2007, Office Action.
U.S. Appl. No. 10/946,254, Mar. 27, 2007, Notice of Allowance.
U.S. Appl. No. 11/061,422, Mar. 30, 2007, Office Action.
U.S. Appl. No. 11/298,818, Apr. 19, 2007, Office Action.
U.S. Appl. No. 11/090,724, Apr. 30, 2007, Office Action.
U.S. Appl. No. 11/128,649, Jul. 5, 2007, Office Action.
U.S. Appl. No. 10/929,000, Jul. 12, 2007, Notice of Allowance.
U.S. Appl. No. 10/916,960, Jul. 27, 2007, Office Action.
U.S. Appl. No. 11/061,422, Aug. 22, 2007, Office Action.
U.S. Appl. No. 11/298,818, Sep. 4, 2007, Office Action.
U.S. Appl. No. 10/946,254, Sep. 7, 2007, Office Action.
U.S. Appl. No. 11/426,295, Sep. 19, 2007, Office Action.
U.S. Appl. No. 11/090,724, Oct. 3, 2007, Office Action.
U.S. Appl. No. 10/916,960, Oct. 29, 2007, Office Action.
U.S. Appl. No. 10/929,000, Oct. 31, 2007, Office Action.
U.S. Appl. No. 11/426,294, Nov. 19, 2007, Office Action.
U.S. Appl. No. 10/916,960, Nov. 28, 2007, Office Action.
U.S. Appl. No. 11/298,818, Nov. 29, 2007, Notice of Allowance.
U.S. Appl. No. 11/061,422, Dec. 27, 2007, Notice of Allowance.
U.S. Appl. No. 11/128,649, Dec. 28, 2007, Office Action.
U.S. Appl. No. 10/946,254, Feb. 7, 2008, Notice of Allowance.
U.S. Appl. No. 11/426,295, Apr. 10, 2008, Office Action.
U.S. Appl. No. 11/090,724, Jun. 27, 2008, Office Action.
U.S. Appl. No. 10/946,254, Jul. 9, 2008, Notice of Allowance.
U.S. Appl. No. 11/128,649, Jul. 23, 2008, Office Action.
U.S. Appl. No. 10/916,960, Jul. 29, 2008, Office Action.
U.S. Appl. No. 11/426,294, Jul. 30, 2008, Notice of Allowance.
U.S. Appl. No. 10/917,200, Aug. 4, 2008, Office Action.
U.S. Appl. No. 10/929,000, Aug. 6, 2008, Office Action.
U.S. Appl. No. 11/426,295, Aug. 21, 2008, Office Action.
U.S. Appl. No. 12/045,603, Aug. 28, 2008, Office Action.
U.S. Appl. No. 11/128,649, Dec. 16, 2008, Office Action.
U.S. Appl. No. 12/356,369, Sep. 23, 2009, Office Action.
U.S. Appl. No. 12/045,603, Apr. 2, 2010, Notice of Allowance.
U.S. Appl. No. 12/117,420, filed May 8, 2008, Jordan et al.
U.S. Appl. No. 12/356,369, Apr. 16, 2010, Notice of Allowance.
U.S. Appl. No. 12/117,420, Sep. 30, 2010, Office Action.
U.S. Appl. No. 12/117,420, May. 11, 2011, Office Action.
U.S. Appl. No. 12/825,145, Jul. 7, 2011, Office Action.
U.S. Appl. No. 12/825,151, Jul. 15, 2011, Office Action.
U.S. Appl. No. 12/117,420, Nov. 22, 2011, Final Office Action.
U.S. Appl. No. 12/825,151, Dec. 28, 2011, Final Office Action.
U.S. Appl. No. 12/825,145, Jan. 3, 2012, Final Office Action.

DISPLAYING A MAP ON A HANDHELD WIRELESS TELECOMMUNICATION DEVICE

RELATED APPLICATIONS

This application is a continuation of U.S. patent application Ser. No. 12/045,603 filed Mar. 10, 2008, now U.S. Pat. No. 7,747,962; which is a continuation of U.S. patent application Ser. No. 11/298,818 filed Dec. 9, 2005, now U.S. Pat. No. 7,343,564; which is a continuation-in-part of U.S. patent application Ser. No. 10/916,960, filed Aug. 11, 2004 now abandoned; which claims the benefit of U.S. Provisional Patent Application Ser. No. 60/494,644, filed Aug. 11, 2003. The foregoing applications are incorporated herein by reference.

BACKGROUND OF THE INVENTION

1. Field of the Invention

The present invention relates generally to communications systems, methods and devices. More particularly, exemplary embodiments of the invention concern systems and methods directed to providing location-based, context-aware content and displaying it within a ticker on a user device.

2. Related Technology

The popularity of the Internet has given rise to a plethora of information services as consumers have become accustomed to accessing timely, personalized news and information. As a result, demand for these types of content services continues to grow. Scrolling information displays, referred to herein as "tickers," are one type of content distribution mechanism that can give a viewer a quick, high-level update, and they have become commonplace on the television news and on sports channels, providing viewers with "at-a-glance" headlines, breaking news, weather reports, sports scores and other updates.

One early example of a scrolling information display or "ticker" on a personal computer (PC) system was that provided by PointCast. Through the PointCast service, PC users could subscribe to news and information channels of interest and receive periodic updates on their computer displays, often in the form of a scrolling information display at the bottom of the user's display screen—commonly known as a ticker. An even earlier example of the use of tickers in conjunction with a PC was the ticker provided by gaming company Catapult Entertainment, Inc. The Catapult ticker, in addition to providing information to users of the gaming system about news and current events and gaming-related information such as upcoming tournaments, high scores, and new software releases, was also interactive through the use of the computer mouse. Rather than being limited to the information in the ticker, the user could click on an item in the ticker having a Universal Resource Identifier (URI) associated with it, which would then cause a web page to be displayed with additional information about that item. More recently, through the use of messaging systems with near-universal reach such as the Short Messaging System (SMS), mobile workers can now receive up-to-the-minute business, financial and customer information on their mobile devices from various news and entertainment content providers and from many other information sources, including corporate portals and customer relationship management applications. Furthermore, tickers are beginning to appear as a method for dynamic information display on mobile communication devices, such as cellular telephones, personal digital assistants (PDAs), and "smart" phones.

While the value of receiving personalized, timely information in a condensed, quickly-read format such as a ticker is indisputable, the information tickers known in the art could be significantly improved. The continued, rapid growth of mobile communication device use is a reflection of the mobile society in which we live, and increasingly we rely on these devices for news and other information in addition to staying in touch with co-workers, friends and family. Furthermore, the location of a mobile communication device having a connection to a network can be easily determined through signal triangulation methods or other methods, and the proliferation of GPS enabled devices fueled by government regulatory requirements to improve public safety means that the location of any cell phone or other mobile communication device can be established. Smaller devices such as wristwatches that can receive information updates promise to make it even more convenient to always carry a mobile communication device, and as applications for these devices such as messaging, calendars and appointment reminders, news alerts, and traffic reports become more popular, the mobile communication device is becoming a more essential requirement for users to guide them through the day. As users of these devices move around from home to work, in and out of conference rooms and buildings, between terminals in an airport, from neighborhood to neighborhood, city to city, and between states and countries, they could benefit significantly from an information service that takes into account their geographical location and information preferences and then provides at-a-glance updates to the user's device that are meaningful and useful to the user in their current location. However, existing ticker services are not capable of responding to the geographic location of the user or providing information that is tailored to the current location of the user.

BRIEF SUMMARY OF AN EXEMPLARY EMBODIMENT OF THE INVENTION

In general, exemplary embodiments of the invention concern systems and methods for providing location-based, context-aware content to communication devices including mobile communication devices and "immobile" or stationary personal computers, and displaying the location-based content within a ticker on the display of the communication device. While the invention is applicable to immobile or "wired" communication devices including computer systems, landline telephones, televisions, and set top boxes, its application is particularly well-suited to mobile wireless communication devices (referred to hereinafter as "mobile communication device(s)" or "mobile device(s)") such as laptop and notebook computers, cellular telephones, PDAs, and any other mobile communication device having a display device and enabled to wirelessly receive data.

More specifically, embodiments of the invention provide for recognizing the geographical location of a communication device by either receiving location information from the device or from the network, or by receiving profile information input by a user of a communication device as to the location of the device. The device location is then correlated with either or both of user preferences and location-based content pertaining to those preferences. Corresponding promotions, local news, local event information and other location-based content is then transmitted to a data store on the device by a network server, or it is selectively retrieved from a data store on the device in which location-based content that has already been transmitted from external servers is stored pending display on the device. In accordance with a scheduling system and certain rules and preferences, the data received on the device is scheduled for display and then displayed within the ticker on the device at the appropriate time using specified formats and presentation attributes. The methods of the invention are proactive in that location-aware content is pushed to the device and/or displayed within the ticker when the user enters or nears a specified location without the need for the user to actively request it.

In the exemplary embodiment, a cellular telephone user subscribes to a location-based ticker service of the invention and indicates preferences for categories of content by inputting the preference via a user interface element on the cell phone. In this case, the user could specify, for example, a preference for Peet's coffee and indicate a desire to be notified each time a Peet's coffee store is nearby. The preference is then stored for future reference by the system. As the user changes location throughout the day, the cell phone reports its geographical location or the cell phone location is otherwise communicated periodically to a location-based ticker server of the location-based ticker service, and from time to time the ticker on the user's cell phone receives content updates, including location-aware content, which is then displayed on the ticker to the user. Alternatively, the location-based ticker server can send a list of Peet's coffee shop locations along with a message for display within the ticker, and store it on the cell phone. Display rules may be received in metadata associated with the content and stored on the cell phone; these rules are then considered by the scheduling system as it determines when the message from Peet's should be displayed in the ticker. For example, based on the user's proximity to a Peet's location, a message could scroll within the ticker that says "Peet's coffee 2 blocks west". Determining a mobile device's location is well understood in the art and can be done through a number of means including GPS, assisted GPS, or RF triangulation. The ticker scheduling system (described in more detail herein) uses the device location and the information about the location of Peet's coffee stores to determine what information to display on the ticker. In accordance with such "proximity rules" and other rules that may be stored on the cell phone, on the location-based ticker server, or both, location-based content for the general geographical area, such as a city, may be displayed, and as the user changes location, the content displayed within the ticker may become more finely tuned and specific to the user's current location.

Member vendors of the location-based ticker service may register information about their products and services, including advertisements, promotional information and entertainment-related information with the location-based ticker service. In this example, Peet's Coffee, a member vendor of the location-based ticker service, could register a promotional coupon with the service, which is then transmitted to communication devices located, for instance, in a particular region such as Northern California. The promotional coupon is associated with metadata that includes a proximity rule stating that if a user arrives at a location within a specified distance of a Peet's retail store, the information is to be displayed on the ticker of the user's device. In this case, the Peet's promotional content may be downloaded at any time—such as during an off-peak time for network traffic—regardless of the user's current location, and stored on the device pending display when the user reaches the location specified in the proximity rule.

Alternatively, the Peet's promotional information may be stored at the ticker server, and then downloaded to the data store on the device in "real-time" or near real-time when the user reaches the specified location. In this case, when the user's cell phone travels near a Peet's Coffee location, the location-based ticker server, having determined that there is a match between the user's preference for Peet's, the user's current location, and the location of the nearest Peet's, transmits data concerning the nearest Peet's location to the ticker on the user's device. The member vendor may specify one proximity rule for mobile communication device users, and another proximity rule for stationary or wired communication devices. Furthermore, other characteristics of the user's device can be taken into account, such as the speed at which it is moving. The speed and direction of motion of the communication device can be determined through GPS offsets or other methods, included in the geographical information about the communication device, and reported to the location-based ticker server or used to select location-based content stored locally on the communication device. A third proximity rule can be specified for devices in motion. For example, if the device is moving faster than fifteen miles per hour, the proximity rules may say that the Peet's promotional content should display if the device is within three miles of a Peet's retail location.

According to this example, Peet's has further specified an expiration time after which the coupon should not be transmitted to the communication devices. Similarly, content transmission may also commence based on time, and the time at which content is transmitted to the device may or may not be independent of the device location. In general, the ticker content can be transmitted or displayed at a time or manner specified by a triggering event. Examples of such triggering events include a specified time or location. Upon the occurrence of the triggering event, content that has been designated as being appropriate for the triggering event (e.g., appropriate for the current time or location of the communication device) is displayed on the ticker or transmitted to the communication device.

Returning to the present example, in some cases the Peet's data may be transmitted directly to a mobile communication device without having first been aggregated at the ticker server. For example, if the mobile device encounters a wireless access point of a wireless local area network (WLAN), such as an 802.11 network, the Peet's data can be transmitted directly to the mobile device.

After the location-based content is transmitted to the device using any of the aforementioned methods, the transmitted data is indexed in a data store on the device according to its attributes, and a scoring algorithm of the scheduling system determines when and how the content will be displayed within the ticker on the device. For example, because the user has indicated a strong preference for Peet's coffee, and the user is only fifty yards away from the retail store, the scheduling system, having considered the device location, rules that may have been received in metadata associated with the content, and user preferences, determines that the content should be displayed within the ticker immediately in a red font, and the device could emit an audible tone and/or vibrate to notify the user that actionable content pertaining to an important preference has arrived in the ticker. Other presentation attributes of the location-based content are also possible. Furthermore, because the location-based ticker server is aware of the preferences of the user, in this case it recognizes that there is a strong possibility that the user may wish to take advantage of the promotional coupon, and it transmits this supplemental content, including the promotional coupon, to cache memory on the cell phone. The user may then click on the Peet's ticker item to cause the supplemental content in cache memory, including, for example, walking directions and the promotional coupon, to be displayed on the cell phone screen or in a web browser on the phone. In one example, a map is presented on the display of the device to graphically illustrate the location of Peet's coffee. The map can be generated based on the current location of the device or based on the location associated with the selected ticker item. The map can be generated by the ticker server or provided using a mapping service from another server that is accessible over a wireless network. The ability to provide a map to Peet's actual location may be easier for a user to follow than a textual description of Peet's location.

Significantly, the location-based, context-aware content can be obtained from multiple content sources using any of a number of data transmission modes or "bearers", depending on the configuration of the device. For example, as the user changes location, a cell phone equipped to communicate with a cellular telephone system and to sense the wireless access points of both Bluetooth and 802.11 networks may obtain stock quotes via an SMS text message, art exhibit content via Bluetooth, and a discount coupon from a nearby retailer associated with an 802.11 network. Data from all of these sources can be transmitted to the device in such a way as to avoid interfering with the other communication services of the device and without the user having taken any action. For example, a location-based content update can be sent to the ticker on the cell phone when it is idle. The user can then view, navigate, and interact with the location-based ticker items while engaging in a telephone call or other communication session by using one or more buttons or soft keys on the mobile device to navigate the ticker. In some embodiments, a map associated with a selected ticker can be presented to the user. In fact, a single click on a ticker item can provide a map based advertisement. In other words, a map can be presented along with other location-based and context-aware content.

In view of the foregoing, the systems and methods of the invention can recognize the geographical location of a communication device and based on the geographical location and other considerations, populate a ticker running on the communication device with location-based, context-aware content. This represents a significant improvement over conventional ticker systems, which fail to take the geographic location of the user into account when populating tickers. Moreover, the ticker systems of the invention are interactive in a way that has not been possible using conventional ticker systems. The tickers of the invention can display news, weather, advertisements, promotions, tourist attraction information, conference room booking information, and special event information, from multiple content sources, to mobile communication device users and stationary computer device users alike. MMS messages email messages and other content may be sent to the ticker from external sources or the device user might send them to his own ticker as a form of "reminder" or "to do" list, for example. The content can be personalized to varying degrees, depending on its source and the method used to transmit it to the device.

These and other aspects of embodiments of the present invention will become more fully apparent from the following description and appended claims.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF EMBODIMENTS OF THE INVENTION

Figure 1:
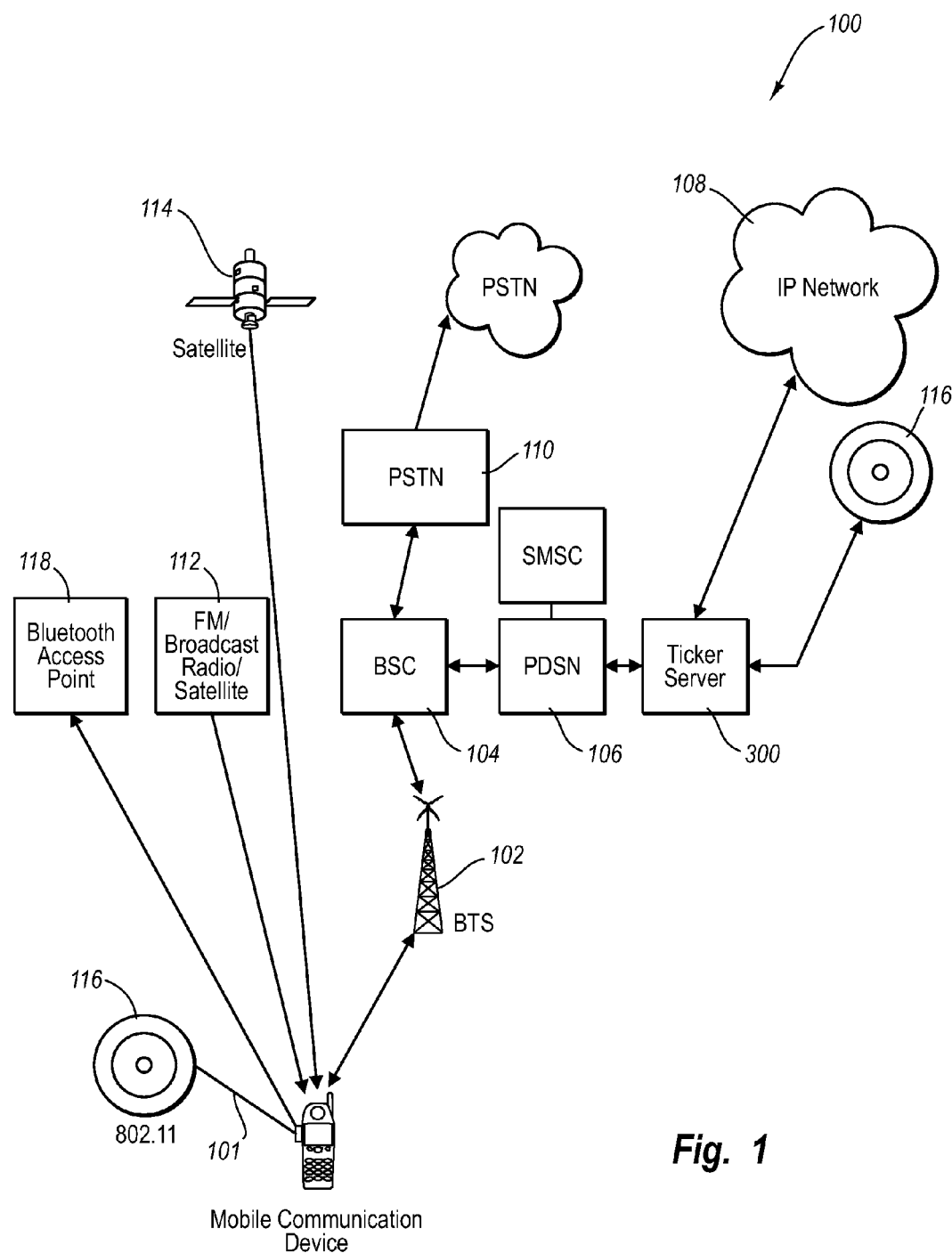
FIG. 1 is a schematic view illustrating aspects of an exemplary operating environment for embodiments of the invention.

Reference will now be made to the drawings to describe various aspects of exemplary embodiments of the invention. It should be understood that the drawings are diagrammatic and schematic representations of such exemplary embodiments and, accordingly, are not limiting of the scope of the present invention, nor are the drawings necessarily drawn to scale.

In general, embodiments of the invention are concerned with recognizing the geographical location of a communication device, and based on the geographical location, user preferences, vendor advertising campaign rules, device configuration and other considerations, providing location-based, context-aware content to a ticker on a communication device. Communication devices that may be employed in conjunction with the invention include PCs, televisions, landline telephones, cellular telephones, PDAs, laptop computers and any other device having a display device and suitably equipped to establish communication with a network. In particular, exemplary embodiments of the invention are directed to the use of mobile communication devices in conjunction with the invention. However, the invention should not be construed to be limited to the use of mobile communication devices. As noted previously, content can be transmitted to the communication device using any of a number of data transmission modes or "bearers" including, but not limited to cellular networks, internet protocol (IP) networks such as the Internet, the Short Message Service (SMS), satellite and terrestrial radio broadcasts, the 802.11 family of wireless local area networks, and Bluetooth networks. For convenience, 802.11 networks and Bluetooth networks may be referred to herein as "wireless access points". Furthermore, various content delivery mechanisms that operate in conjunction with a bearer are supported by the ticker, including multimedia messaging service (MMS), really simple syndication (RSS), and email, among many other content delivery mechanisms.

Embodiments of the invention include content gateways through which some content providers make content including maps available to users of the location-based ticker service. Other content providers, such as product vendors with products and services to advertise, may register with the location-based ticker system and input marketing and advertising campaigns into the system as well as make maps to locations of the vendors or content providers available for display on users' communication devices. Methods of the invention allow users to subscribe to the location-based ticker service of the invention, express preferences for certain types of content, and block other types of content. Filters residing on the communication device manage receipt of location-based content on the device in accordance with user preferences. Depending on the metadata and other rules associated with the transmitted advertising, promotions and other location-based data, the data may then be scheduled for display within the ticker on the device. Methods of the invention provide for a scheduling mechanism that employs a scoring algorithm to, among other things, reconcile the display rules of content competing for display time in the ticker and determines which content is displayed within the ticker, at what time, in what order and with what frequency. Furthermore, the manner in which the transmitted data is displayed can include a wide variety of content presentation attributes, including the shape, size, speed and location on the display screen of the ticker, multiple font effects, and audible or tactile notifications indicating that new location-based content has arrived at the ticker. Finally, the methods of the invention provide an accounting system to track and report activities associated with ticker usage.

I. Operating Environments and Associated Devices

With particular attention now to FIG. 1, one exemplary implementation of an operating environment, denoted generally at 100, is indicated. Although this exemplary operating environment comprises multiple types of networks, including a cellular telephone network, wireless access points for 802.11 networks and Bluetooth networks, and broadcast networks such as FM radio or satellite radio, the invention may be employed in connection with any other type of network and associated devices that are effective in implementing or facilitating wireless communication or landline communication. While FIG. 1 depicts a cellular telephone and exemplary embodiments are directed to the use of cellular telephones in conjunction with the invention, the invention should not be construed to be limited to such devices. As previously noted, PCs, televisions, landline telephones, cellular telephones, PDAs, laptop computers and any other device suitably equipped to establish communication with a network and having a display device may be used to implement the methods of the invention. Accordingly, the scope of the invention should not be construed to be limited to the exemplary operating environment indicated in FIG. 1.

In the exemplary illustrated embodiment, the operating environment 100 includes one or more mobile communication devices 101 configured to communicate with one or more networks and/or network elements, including base transceiver station (BTS) 102 of the cellular network, IP network 108, FM or satellite radio broadcast network 112, 802.11 wireless access points 116, and Bluetooth wireless access point 118. Mobile communication device 101 may determine its geographical location using positioning techniques such as a global positioning system (GPS) or wireless-assisted GPS, for which it uses one or more satellites 114. Its location can also be determined by other methods, such as triangulation of the signal from the cell sites serving the mobile device or by simply encountering an 802.11 or Bluetooth wireless access point, which effectively positions the device. Alternatively, the device location may be determined by querying another server on the network that contains location information about the device. The location of landline devices may be explicitly specified by the device user through submission of an information profile to the location-based ticker service. Mobile communication devices 101 are further configured with ticker client software that enables them, among other things, to communicate with ticker server 300 that may be embodied, in one implementation, as a server operating in conjunction with IP network 108. Ticker server 300 may further interface with other network elements, such as a Short Message Service Center (SMSC) and various gateways to implement the methods of the invention.

II. Multiple Bearers, Content Delivery Mechanisms and Receiving and Displaying Location-Based Content Directing attention now to FIG. 2, details are provided concerning an example of ticker client software 200. Ticker client software 200 resides on the communication devices used in conjunction with the invention. In the exemplary embodiment, ticker client software 200 is installed on mobile communication device 101, which is suitably equipped to establish a connection with one or more networks and send and receive data. Ticker client software 200 operates in conjunction with a ticker server discussed in more detail below.

Ticker client software may include filter 202, meta tagging mechanism 204 and security system 206. Location-based content can become available to ticker client software 200 operating on mobile communication device 101 from multiple content sources and over various types of network connections. In one case, content providers may supply location-based content through various gateways to ticker server 300 or content providers may alternatively submit product and service content to the location-based ticker server directly. In either case, the location-based content may then be transmitted to ticker client software 200 using any of a number of bearers for example, a data connection over a cellular network, and SMS. Alternatively, location-based content can be supplied to ticker client software 200 directly, without having first been aggregated at ticker server 300. For example, a user of mobile communication device 101 enabled with ticker client software 200 and equipped with a Bluetooth chipset may receive location-based content directly when it encounters another Bluetooth device. Bluetooth is a wireless technology typically used for short range communication of data and voice from one device to another, usually within a small area. One example of such an application would be the ability to receive into the location-based ticker a detailed description of an art exhibit being viewed by the user. In this case, the content sent to mobile communication device 101 is both location-based and context-aware, in that the device automatically senses the wireless access point of the Bluetooth network and receives content specific to the context, in this case an art exhibit. In addition to communicating the ticker content directly to the device using one of the aforementioned bearers, it could deliver it using any of a number of content delivery mechanisms such as email. For example, when mobile communication device 101 communicates with the Bluetooth access point, it might provide its email address to the art exhibit system. The system could then send specific content to that email address with special codes indicating that it is to be interpreted by the ticker software on that device. Mobile communication device 101 may further be configured to interact with the 802.11 family of wireless local area networks, and when it encounters a wireless access point of such a network it can similarly receive location-based, context-aware content such as a promotional coupon for a nearby restaurant, and then display it in the ticker at 12 p.m. or at another user-specified lunchtime. The location-based, context-aware content may also include a map to a location associated with the content. A single click can provide a promotional coupon, a map, and other information. A map to a particular location may also be included as a link. For example, some types of networks may not be able to accommodate a graphic such as a map. By including a text based link, however, the user can follow the link and cause the map to be displayed on the user's device using another network that can accommodate such an image. This enables a device to provide a location-based and context-aware map in situations where a map is not necessarily compatible with the available network. Ticker client software 200 may also monitor broadcast networks such as FM radio and satellite radio and "pick and choose" content that is relevant to the user.

Generally, the value of utilizing multiple bearers is that some transmission mechanisms are better suited to delivering certain types of content than others. In some cases, the location-based ticker system may select a bearer based on the nature of the content itself. For example, a very small data payload that should be delivered in "real-time" or near real-time, such as a local traffic alert, may be delivered using broadcast SMS. Conversely, a data payload that is larger in size and that contains personalized content, such as tourist site information that includes a review of a nearby restaurant and a discount coupon, may be delivered over an IP connection. In other situations, the fastest way to obtain real-time data, such as a baseball score, while using the least amount of communication device overhead may be for the ticker client software to obtain the baseball score from a satellite or terrestrial radio broadcast. Furthermore, highly personalized content, regardless of the size of the transmission, may be more appropriately delivered over a cellular network using a data connection. It should be noted that regardless of the location-based content source or bearer used, the content is typically transmitted to mobile communication device 101 at a time when the device is not otherwise engaged in a communication session to avoid any disruption in communication. Content may also be transmitted at a time when network traffic load is considered to be off-peak in order to conserve bandwidth, or a bearer may be chosen based on network traffic loads.

In any case, when location-based content becomes available from a source that is external to ticker client software 200, filter 202 evaluates it to determine if it should be received. Security element 206 further examines the available content to ensure it is from a credible source. If filter 202 decides, based on rules and preferences 210 that the content should be received, and security 206 further endorses receipt of the content, meta tagging module 204 may associate metadata with the content, which describes the attributes of the content being received and which may be in addition to metadata already associated with the content by the content provider. The content is then received into data store 208 and indexed in data store 208 according to its attributes. The aforementioned rules and preferences 210 are specified by the user upon registration and/or subscription with the location-based ticker service to assist in controlling and managing receipt and display of location-based content within the ticker. Among other things, the user can express preferences for certain types of content or the user may block receipt of certain types of content or content sources. The user can further specify preferences for the form taken by the ticker, such as its shape, size, and location on the display of mobile communication device 101. Rules and preferences 210 can be modified by the user at any time. In addition, the location-based ticker service can modify what is displayed to the user based on a history of ticker items the user has previously interacted with, thus inferring the user's preferences. The history of the ticker activity, the explicit user preferences and rules, and other criteria other than geographic location, are referred to herein collectively as "user criteria," which can be used to filter incoming location-based content and to determine whether and when to display the content on the ticker.

Once received into data store 208, scheduler 212 determines the time at which the location-based data will be displayed relative to all of the data received and scheduled for display within the ticker. In some cases, location-based content may be displayed immediately after its receipt into data store 208, based on the ticker server's knowledge of the device location. In other cases, location-based content is received and stored in data store 208 for a period of time before it is displayed within the ticker. In this case, content engine 224 of ticker client software 200 is responsible for periodically checking the location of the device and then interfacing with data store 208 to search for matches between the current location of the device and available content. In still other cases, the immediacy of an encounter between a WLAN and the mobile communication device causes location-based content to be received and displayed within the ticker. In all of these cases, scheduler 212 is responsible for determining the timing and order in which all of the available location-based content is displayed in the ticker of mobile communication device 101.

In addition to location-based content received from sources external to the mobile communication device 101, local applications 220 operating on the device 101 can also generate data and submit it to scheduler 212 to be scheduled for display within the ticker. For example, a calendar application may send an appointment alert to scheduler 212 for display within the ticker. The scheduler is able to take into account the time sensitivity of the data and schedule its display within the ticker accordingly. In another example, the local applications 220 can simply generate a call for a map of an area that is local to the current location of the communication device 101. In this manner, a map can be obtained for location-based content in situations where the content does not provide or is not associated with a map.

Figure 2:
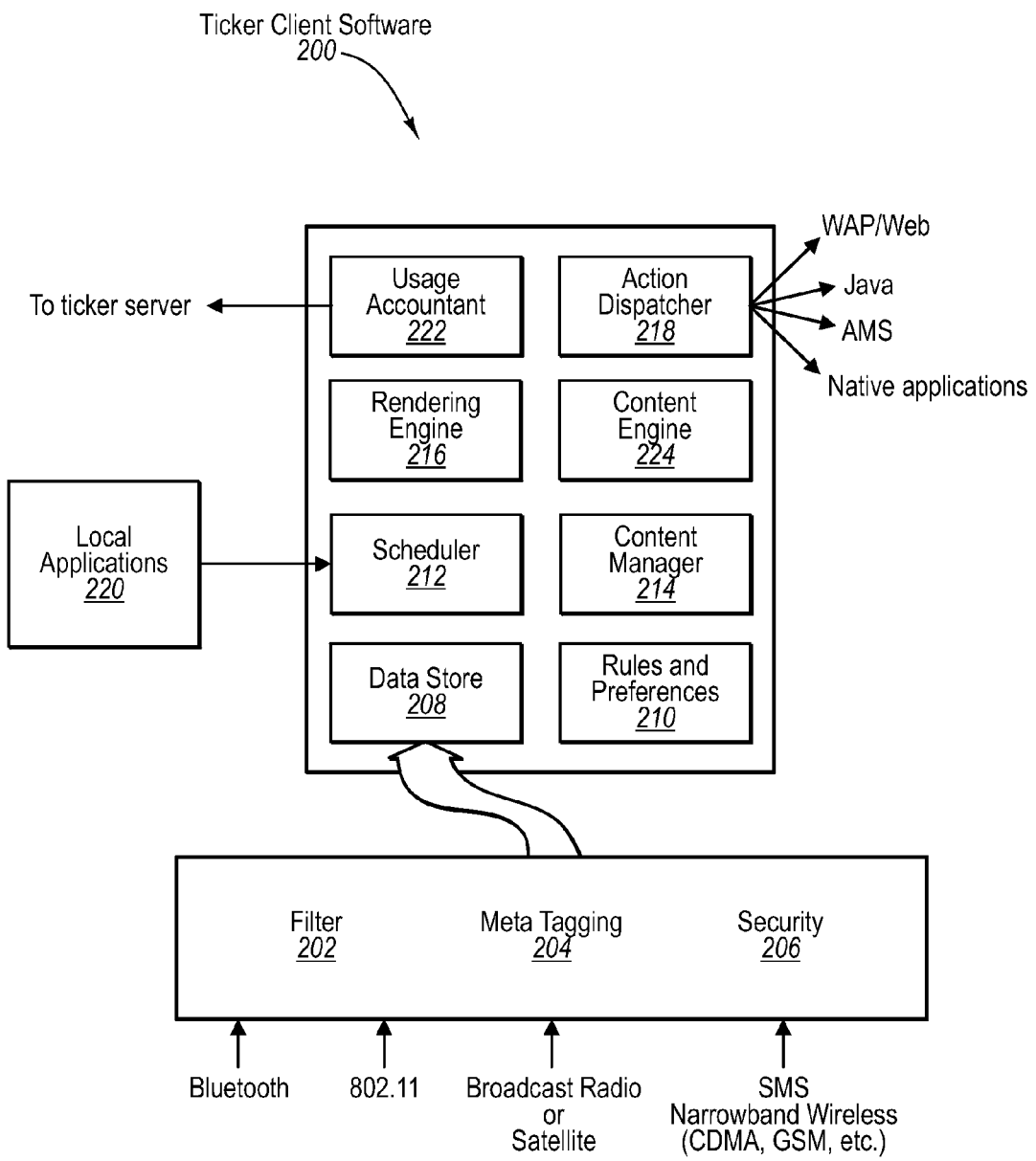
FIG. 2 is a schematic view illustrating aspects of location-based ticker client software.

With continuing attention to FIG. 2, content manager 214 interfaces with data store 208 to manage the ticker content. For example, the content manager keeps only the latest score in a sports game and deletes previous versions. It also deletes old or expired content or content that the user has viewed and should be deleted based on rules contained in the metadata. In one example, a news alert about a particular event may be stored and scheduled for display in the ticker at a particular time. If updated content is subsequently received in data store 208, content manager 214 ensures that the most recent news alert is displayed in place of the older content already scheduled for display.

Rendering engine 216 of ticker client software 200 receives input from rules and preferences module 210 concerning the look and feel of the location-based content displayed on mobile communication device 101. For example, the user may want the location-based content to appear in the "traditional" ticker format, wherein it scrolls horizontally across the bottom of the display screen. Alternatively, the user may wish to view the location-based content as a rotating, three-dimensional box, with each face of the box showing a different category of location-based content. The ticker may display special attributes such as transparency, which allows the user to see through the ticker to what is displayed behind it. The user may further specify that certain categories of location-based content be displayed passively within a scrolling, horizontal ticker, whereas other categories of location-based content should be displayed in a more dramatic way, such as with specialized font attributes, in a particular color, and with accompanying animations, such as "entrance" animations.

Presentation effects including contrasting font color, "new" graphics, a change in the order of presented items and audible and tactile alerts may be used to denote new location-based content received. A "free form" ticker could be employed in which new, location-based content "flies" onto the display screen without being contained within the specified ticker format(s). Similarly, location-based content can "fade in" or "fade out" from the display screen, or "builds" may be used in which fragments of content are displayed one after the other, rather than all at the same time, until the complete content is displayed. In one example, rendering engine 216 could be instructed to display a particular local traffic update with an entrance animation that flies across the display screen and flashes. The entrance animation could be further accompanied by an audible or tactile notification, such as a ring tone or device vibration to alert the user of a traffic accident on the user's transportation route. Rendering engine 216 may further implement numerous attributes and effects pertaining to the shape, size, location, scroll speed, font attributes, color schemes and themes of the location-based content displayed in the ticker and of the behavior of individual location-based ticker items or categories of location-based ticker items and render them on the display of mobile communication device 101 accordingly.

III. Ticker Interaction and Use

With continuing reference to FIG. 2, the ticker of ticker client software 200 may be interactive. Action dispatcher 218 manages user interaction with the ticker and interfaces with the rest of the communication device on which the ticker is hosted in response to user interaction with the ticker. In one case, the user may employ ticker navigation effects, such as scrolling through the ticker at a faster rate, skipping items, or even deleting ticker items by pressing a single button on the mobile communication device. User interaction with an item displayed within the ticker, (a "location-based ticker item") such as by clicking on the item, scrolling to it, highlighting it or otherwise selecting the item, can cause a secondary action. In one example, a URI associated with the location-based ticker item is launched when the user selects the item, such as by clicking on the item, resulting in display of a web page containing additional content about the item. The content may include a map illustrating a location associated with the selected location-based ticker item. In another the user approaches his favorite video store, he may receive an advertisement in the ticker announcing the availability of a new movie available for rent. Any of a number of content delivery mechanisms, including multimedia messaging service (MMS) and really simple syndication (RSS), can be supported by the ticker, and in this example the advertisement may be sent using the MMS as the content delivery mechanism. Selection of the advertisement can give the user the option of downloading a Java application for example, which is a movie trailer. The user may then wish to send an email or other message to the store to reserve the movie. The action dispatcher 218 interfaces with the appropriate external systems to manage download of the Java application and dispatch of the message to the store. Once the movie trailer is downloaded, it can be viewed on the communication device. Another example of interactive ticker use is to conduct a poll or a survey. Users leaving the premiere of a new movie could be presented with a poll in the ticker. Clicking on certain items in the ticker would indicate the user's response to the questions in a poll. Similarly, users could receive a customer satisfaction poll upon leaving a retail store from which they have purchased a product or service. Additionally, selection of the previously mentioned appointment notification displayed in the ticker can cause the calendar application to be launched so the user can view the full details of the impending appointment, and receive driving directions to the appointment based on his current location.

Finally, ticker client software 200 employs usage accountant 222 to monitor and track the location-based data displayed within the ticker and the various ways in which the user interacts with the location-based ticker items. For example, selecting an advertisement for a new restaurant may result in driving directions being displayed in a WAP browser, and the user may further be presented with an option for automatically dialing the restaurant phone number to make a reservation. The usage accountant 222 monitors and reports on the transaction so the advertiser receives feedback about response to the advertisement. In this case, whether or not the user dials the phone number is a very important piece of information for the advertiser. At the same time, the selection of the ad by the user is accounted for so the advertiser of the restaurant can be charged, as with pay-for-performance advertising business models. In addition to monitoring and reporting on transactions that result in billing activity, user interaction with location-based items in the ticker is also aggregated in order to better understand user preferences, supply the user with location-based content which is even more finely tuned over time to meet user needs, and to maximize the effectiveness of advertising campaigns. The usage information is periodically reported to usage accounting 304 of ticker server 300. Moreover, the user may view a historical record of ticker items displayed and a history of interaction with the ticker by selecting an icon in the ticker that serves a web page or otherwise provides a report with the historical ticker data to the user.

IV. Registration, Content Aggregation and Campaign Management

Figure 3:
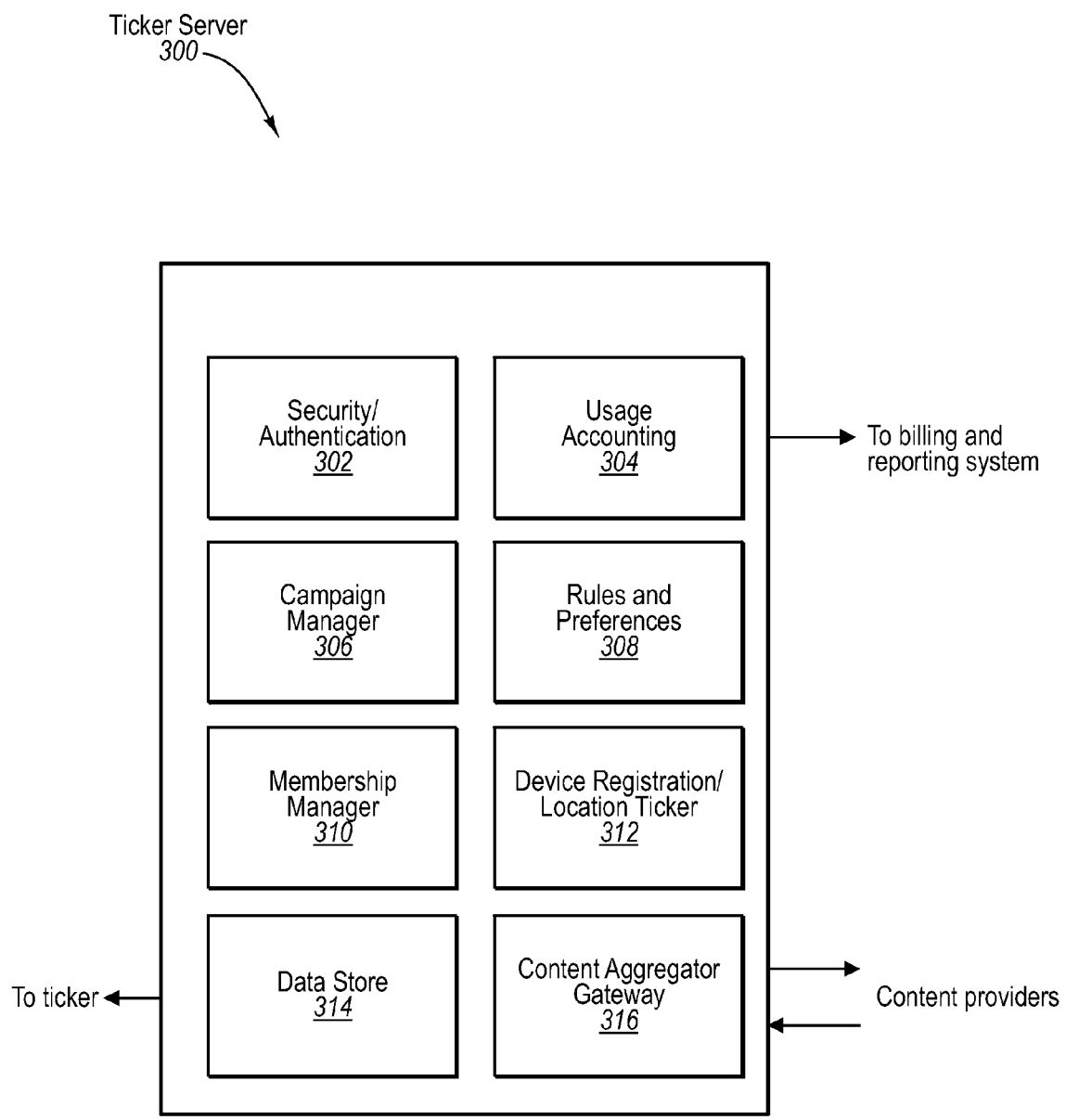
FIG. 3 is a schematic view of an exemplary implementation of a location-based ticker server.

With reference now to FIG. 3, details are provided concerning an exemplary implementation of ticker server 300. In the exemplary embodiment, ticker server 300 operates in conjunction with a plurality of content providers and mobile communication devices 101. To gain access to the location-based content offered by the plurality of content providers, ticker client software 200 resident on mobile communication device 101 registers with device registration and location tracker module 312 of ticker server 300. Using user interface elements of ticker client software 200, the user of mobile communication device 101 may further express rules and preferences concerning the type of location-based content in which s/he is interested and the manner in which it should be displayed within the ticker on the device. Once expressed, the rules and preferences may be stored on mobile communication device 101 in rules and preferences module 210, in rules and preferences module 308 of ticker server 300, or both. Along with specifying rules and preferences, a user of a landline communication device such as a PC or telephone may also indicate the geographical location of the device by completing an information profile during the registration process. Once initial registration is completed, device location information can be provided to location tracker module 312 and ticker client software 200 may begin receiving location-based content.

In the exemplary embodiment, ticker server 300 aggregates some content, but as previously noted, other content may be delivered via other means to ticker client software 200 on mobile communication device 101. Content providers may become members of the location-based ticker service by registering with the service using membership manager 310. Once registered, content can be provided to the ticker server for distribution to registered mobile communication devices 101. In some cases, content providers can deliver content directly to the ticker client software, and in some situations the user may be prompted to accept or reject the location-based content that is available for provision directly to the ticker client software.

With continuing attention to FIG. 3, content can be delivered to ticker server 300 in various ways. First, content providers, including large entertainment conglomerates such as MTV and Disney, as well as smaller, independent content providers, may feed content to the location-based ticker server through content aggregator gateway 316 that provides a means for potentially disparate content servers to interface with ticker server 300. Content received via content aggregator gateway 316 may then be stored in data store 314. Alternatively, vendors of products and services may choose to input company and product information, as well as advertising and promotions into campaign manager 306 of ticker server 300. In another embodiment, a third party marketing campaign management system may interface with ticker server 300 to deliver content to data store 314. Campaign manager module 306 provides vendors and other content providers the capability to create and manage marketing campaigns for their products and services. Product and service information may be input via a web page and can include details such as the message to appear on the ticker, which customers should see which messages, product descriptions, competitive comparisons, promotional discounts and other information. Terms of use, pricing, promotion duration, and other marketing and advertising campaign details can be specified, implemented and updated using campaign manager 306. In some cases, the content can be encrypted before it is transmitted to the communication device. Decryption can be performed, for example, by transmitting a key from a local access point in the network to the mobile communication device at an appropriate time or location to enable the mobile communication device to decrypt location-based content that it already has.

Once the encrypted content is downloaded to data store 208 of ticker client software 200 (reference FIG. 2), when the device arrives at the specified location and at the specified time, campaign manager 306 can initiate transmission of a key to the communication device to "unlock" the content such that it can be displayed within the ticker. Campaign manager 306 further provides capability for receiving feedback from usage accountant 222 of ticker client software 200 (see FIG. 2) and reporting on how many users have responded to vendor campaigns by interacting with the ticker. In any case, metadata, such as target user demographics and terms and conditions, may be provided along with the content provided to ticker server 300. For example, an automobile manufacturer may specify that its advertisement for a newly released vehicle be sent to communication devices within a certain proximity to a dealership to encourage the user to stop by to view the new vehicle. It may further specify the age of the recipient and also send a special promotional offer to users who are previous buyers from the manufacturer and whose lease agreements are close to expiring Security and authentication module 302 provides a variety of security services, including secure registration and authentication both for communication device users and for content providers, as well as monitoring the source of incoming content to ensure that only credible, registered users are interacting with the location-based ticker server and that only authenticated content is delivered to the ticker client.

Usage accounting module 304 performs a variety of processes related to tracking the use of the content provided to ticker client software 200, including receiving usage data from usage accountant 222 (depicted in FIG. 2) of ticker client software 200 and exporting usage data to external billing, reporting, and campaign management systems.

Figure 4:
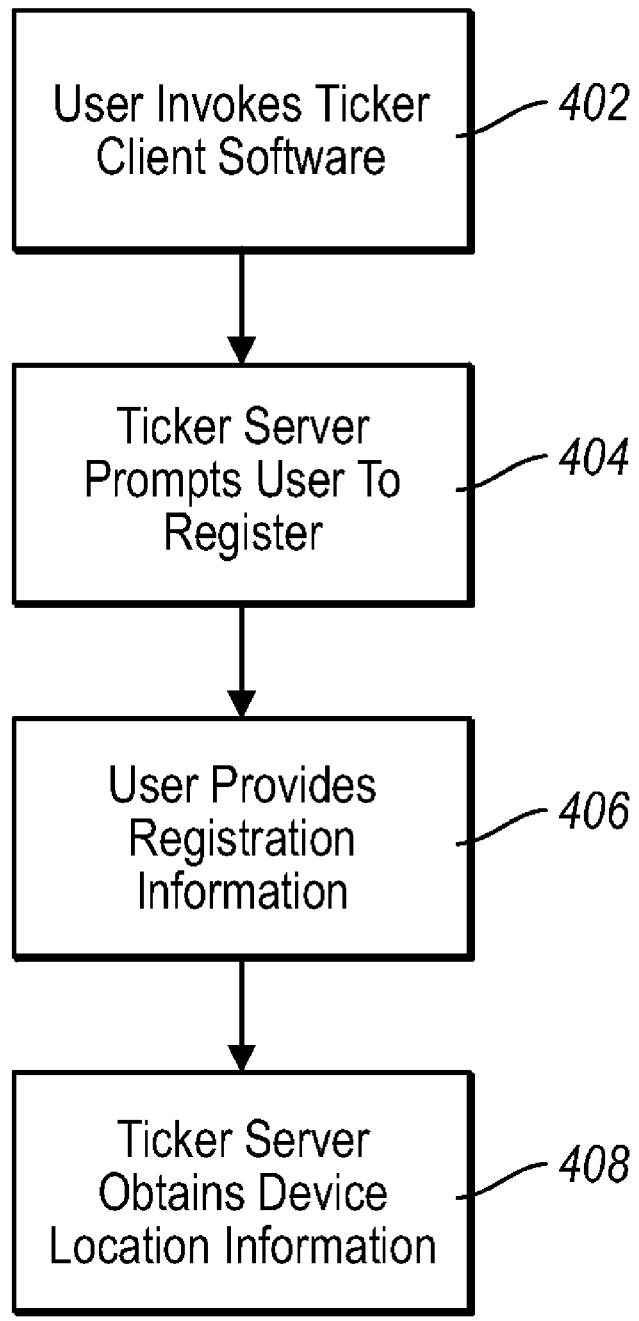
FIG. 4 is a flow chart illustrating aspects of a process for registration and location of a mobile device.

Turning now to FIG. 4, one embodiment of a process 400 is illustrated that is concerned with initial registration and location of mobile communication device 101. In operation, mobile communication device 101, which is configured with ticker client software 200, establishes a network connection in the conventional manner. At stage 402, ticker client software 200 is invoked in response to the user powering on mobile communication device 101 or by pressing a button, a soft key or issuing a verbal command to the device. At stage 404, the user is prompted by ticker server 300, which has established communication with ticker client software 200, to register with the location-based ticker service. At stage 406, the user provides registration information, including billing address, device information, and content preferences, including ticker and content presentation attributes, and any other information requested by ticker server 300 in conjunction with location-based ticker service registration requirements. Upon completion of stage 406, ticker client software 200 of mobile communication device 101 is prepared to receive location-based content. At stage 408, location tracker 312 of ticker server 300 (see FIG. 3) obtains location information for mobile communication device 101. In one case, mobile communication device 101 determines its location using any of the aforementioned positioning techniques known in the art and reports its location to location tracker 312. In other cases, location tracker 312 may query one or more network elements, such as a home location register (HLR), a visiting location register (VLR) or another element in the network to obtain location information for mobile communication device 101.

Figure 5:
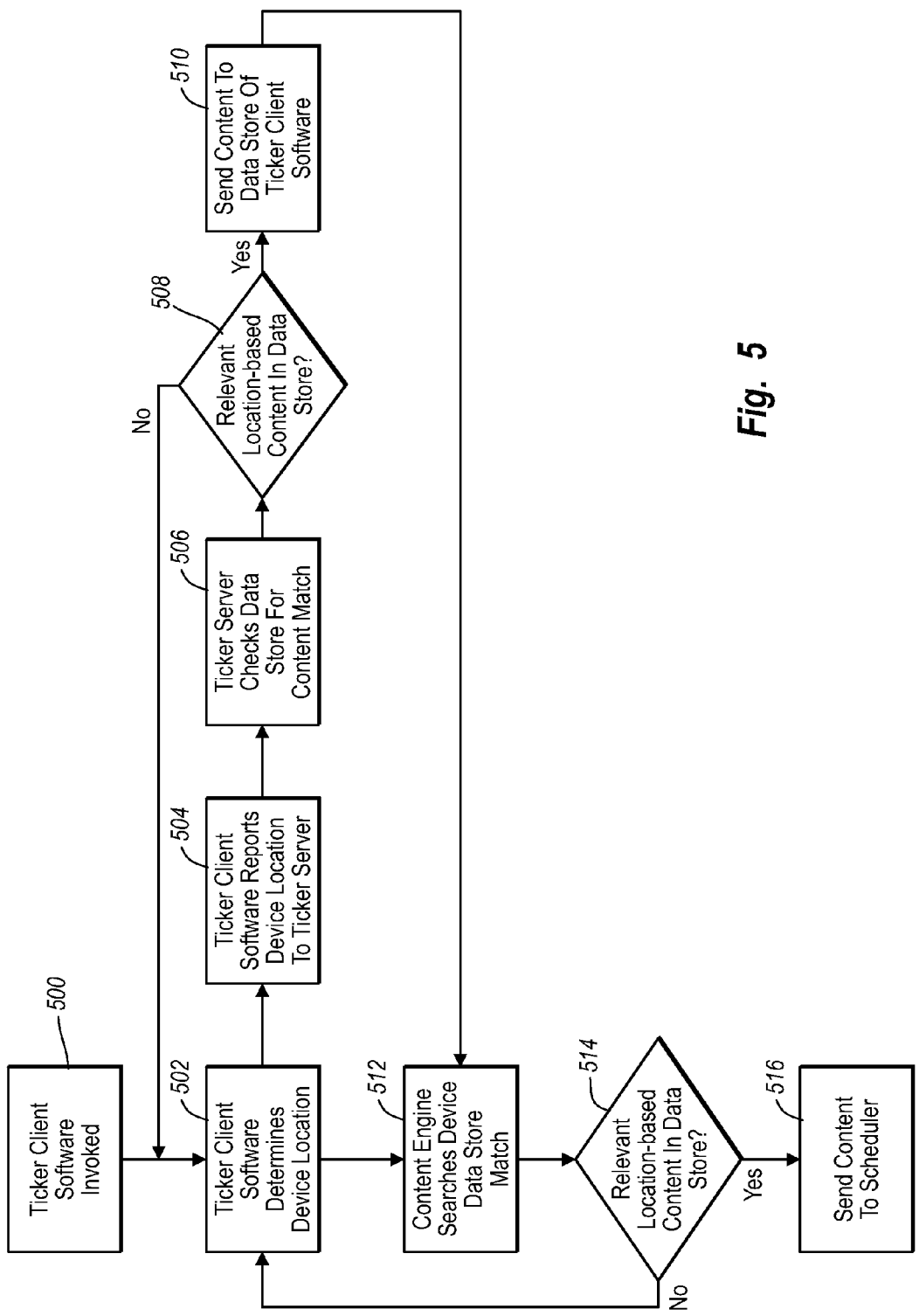
FIG. 5 is a flow chart illustrating a process for transmitting location-based content to a communication device.

Turning attention now to FIG. 5, a process for providing location-based content from ticker server 300 to ticker client software 200 on mobile communication device 101 is illustrated. In one embodiment of the invention, location-based content can be selected for scheduling and display from local data store 208, from ticker server data store 314, or both. In operation, ticker client software is invoked at stage 500 either automatically by powering on mobile communication device 101, pressing a button or soft key on the device, or by a voice command. At stage 502 the ticker client software establishes its location. Once the geographical location of mobile communication device 101 is determined by ticker client software 200, the process can proceed along two different paths and the paths can be executed simultaneously. At stage 504 the ticker client reports its location to location tracker 312, of location-based ticker server 300, which causes a query to run at stage 506 against data store 314 to search for relevant location-based content. At stage 508 a decision is made as to whether there is a match between available content and the user's location and/or preferences. If a match is found, at stage 510 the content can be sent to data store 208 of ticker client software 200 using any of a number of transmission methods previously mentioned. In some cases, content that is low priority may be transmitted to ticker client software 200 at a time that is determined to be an off-peak time for network traffic, that is, the location-based ticker server has access to information about network loads such that it can determine peak and off-peak times with regard to traffic load and transmit the content accordingly based on its priority. Although not depicted, filter module 202, meta tagging module 204 and security module 206 may be employed to validate the source of the content and associate metadata with the content before it is stored in data store 208. Meanwhile, at stage 512, having established the location of the device, content engine 224 can query data store 208 of ticker client software 200 to search for relevant content already stored on the device pending display, and for newly received location-based content. The process continues at stage 514 where it is determined whether any of the content in data store 208 is a match for the user's current location and/or preferences. If it is determined that there is a match, the content is sent to scheduler 212 at stage 516 and prepared for display within the ticker.

Figure 6:
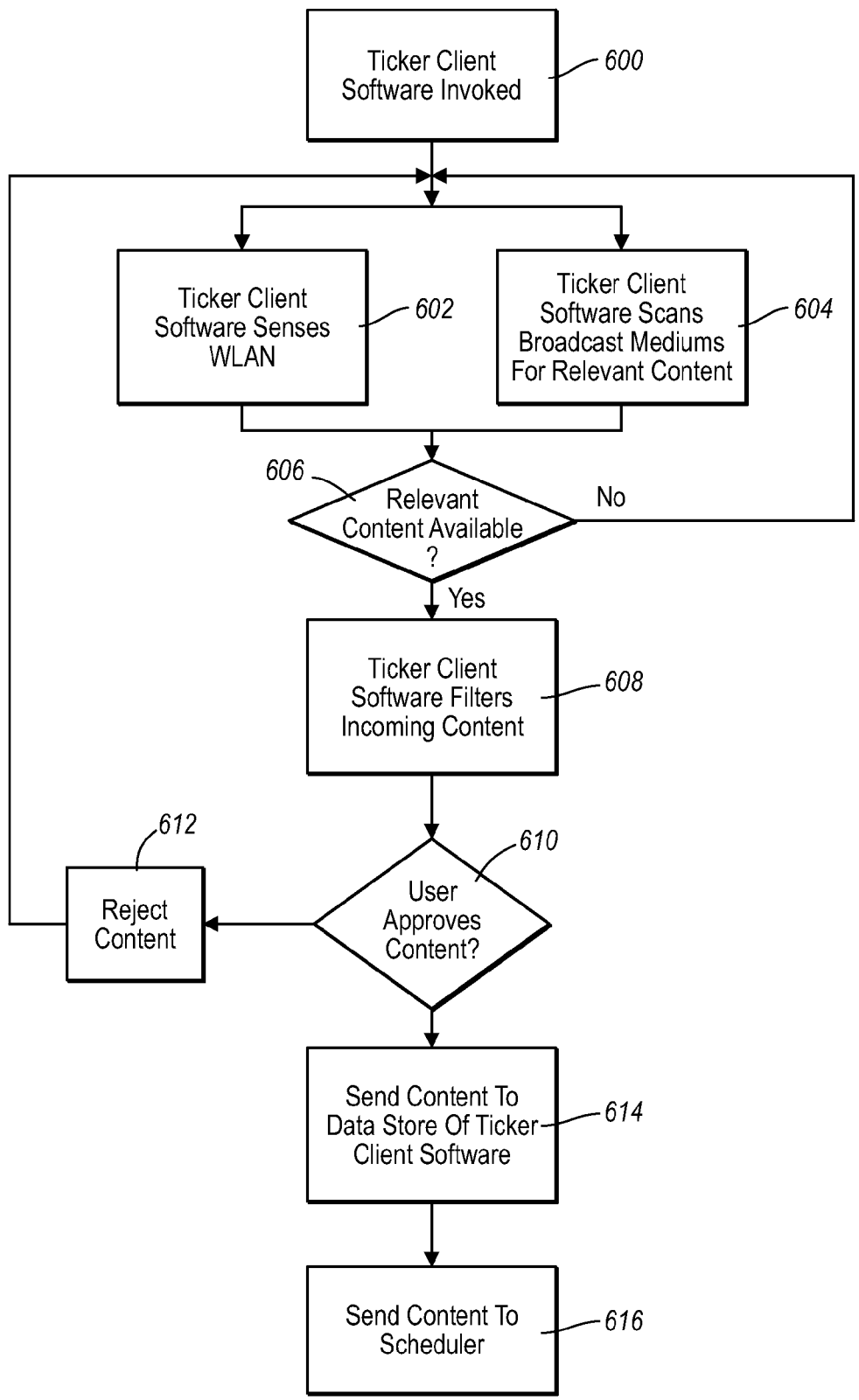
FIG. 6 is a flow chart illustrating a process for transmitting location-based content to a communication device.

With reference now to FIG. 6, a process is illustrated for receiving location-based content via a broadcast medium, an 802.11 network or a Bluetooth network. In one embodiment, invoking the ticker client software at stage 600 causes it to automatically attempt to detect a wireless access point. At the same time as it is attempting to detect wireless access points at stage 602, at stage 604 it can also monitor various types of broadcasts, such as FM broadcasts or satellite radio broadcasts for relevant, location-based content. At stage 606, ticker client software determines if any wireless access points are available from which to receive location-based content. If wireless access points are available, they can begin sending content to ticker client software. At stage 608, ticker client software filters incoming location-based content for relevancy and credibility. In one embodiment, the user can be prompted by security module 206 of ticker client software 200 to explicitly approve incoming content as depicted at stage 610, however this stage is not required and rules pertaining to approval of content can be specified by the user. In this case, if the user rejects the incoming content, the process returns to stage 602 and 604 wherein ticker client software "monitors" various broadcasts and continues to look for wireless access points. If the incoming content is accepted by the user at stage 610, the process continues to stage 614 in which the content is sent to the data store of the ticker client software. Although not depicted, meta tagging module 204 may assign metadata to the incoming content describing its attributes so it can be properly indexed in data store 208. The content is then sent to the scheduler and scheduled for display within the ticker.

V. Content Priority Scores

Figure 7:
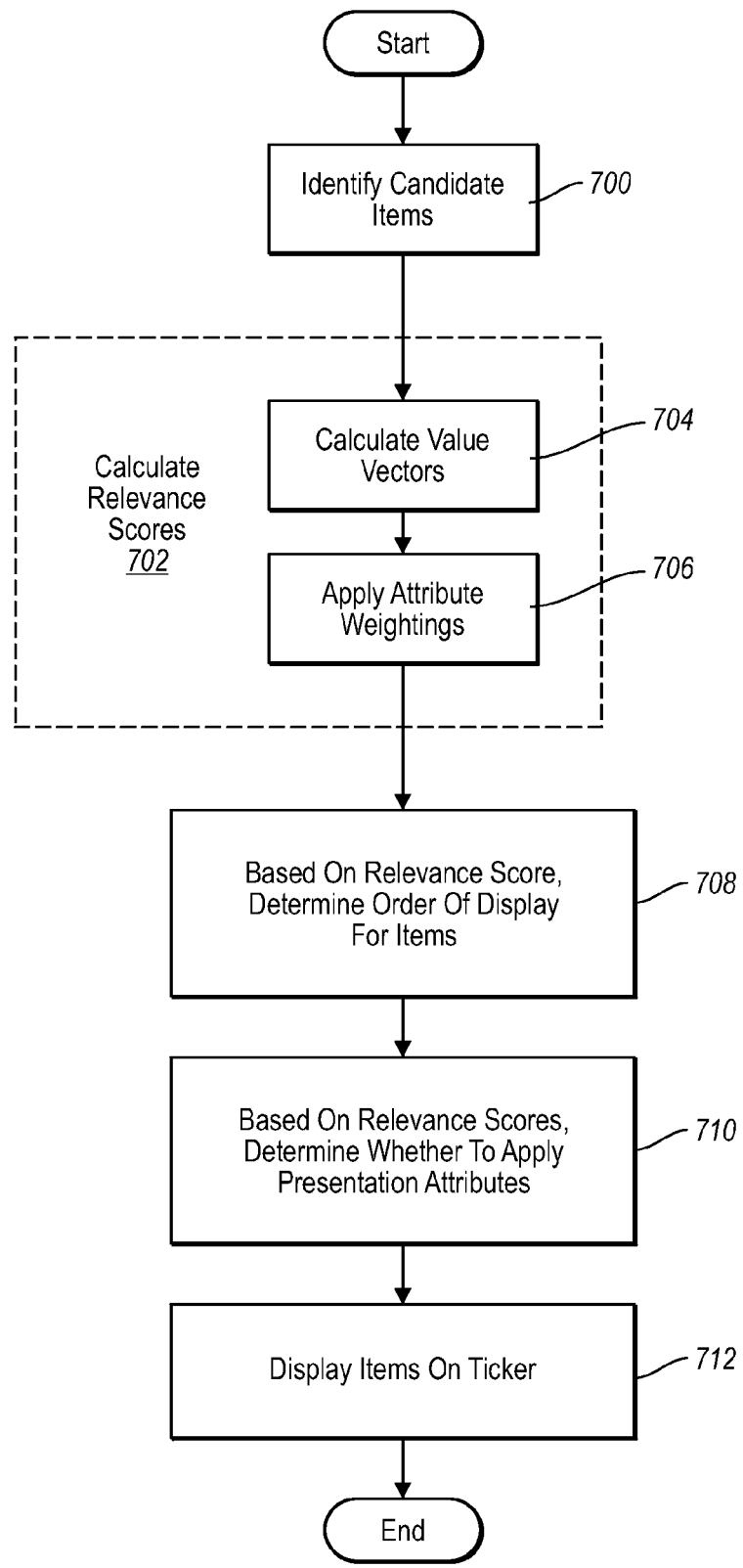
FIG. 7 is a flow chart illustrating aspects of a scoring algorithm for selecting and displaying content within a ticker on a display device.

With reference to FIG. 7, details are provided concerning the process of using an algorithm employed by scheduler 212 of ticker client software 200 (see FIG. 2) to determine the timing, order, and frequency with which location-based content received into data store 208 is displayed within the ticker. Conditions such as strength of user preferences, time sensitivity of the content, degrees of relevance of the content, proximity to a location pertaining to the content, how often the content has been shown, content provider business arrangements, marketing campaign rules and other conditions are evaluated and a numerical value reflecting the priority of the location-based content is assigned to the content. Content with the highest score is displayed within the ticker on mobile communication device 101 first, and if the score surpasses a certain priority threshold, presentation attributes, such as contrasting font colors or notifications may be applied to the displayed content.

For example, three items (advertisement for Peet's coffee, updated stock quote, and an ad for McDonalds) are identified as being candidates for display on the ticker at stage 700. The scoring system calculates a relevance score for each item at process 702 based on a number of system-defined attributes; in this case proximity, user preferences (our user loves coffee and follows the stock market), and the advertising rate paid by the advertiser are the attributes considered in the calculation. The process 702 of calculating the relevance score includes calculating a value vector for each of these three attributes for each item in stage 704. Using a scale from 0 to 100 as an example, the score for Peet's might be (50, 100, 50) since the user is a few blocks from the coffee shop, has specified a strong preference for Peet's brand coffee, and the advertising fee being paid by Peet's is in the middle of the range of advertising fees paid. For the stock quote, the value vector might be (0, 100, 0), since proximity does not apply and no advertising fee is being paid, and for the McDonalds ad the value vector is (0, 0, 75) since the user is not near a McDonalds, nor has the user expressed a preference for McDonalds, but McDonalds is paying a very high advertising rate to promote their new product in the ticker display.

Given these three value vectors, an attribute weighting is then applied in stage 706 of the process 702 of calculating the relevance scores. In this example, proximity is most important and has a weight of 100, user preferences are the next most heavily weighted attribute with a weight of 80, and the advertising fees paid are assigned a weight of 50. A score can now be calculated for each of these items, which will determine the order in which the items are displayed in the ticker according to stage 708. In addition, the relevance scores can be used to determine in stage 710 whether to apply presentation attributes to the items when they are displayed on the ticker in stage 712. The calculations for these items in this example are as follows:

Peet's: 50*100+100*80+50*50=15500;
Stock quote: 0*100+100*80+0*50=8000;
McDonalds: 0*100+0*80+75*50=3750.

Thus, in this example, the Peet's item would be displayed first, the stock quote second, and McDonald's last. These scores can also be used to determine how often to show content. In this example, the device might show the Peet's coffee item twice as often as the stock quote, and four times as often as the McDonald's item. Of course other scoring systems and scheduling systems could be used, and the specific parameters can be highly customized for the particular application.

Figure 8:
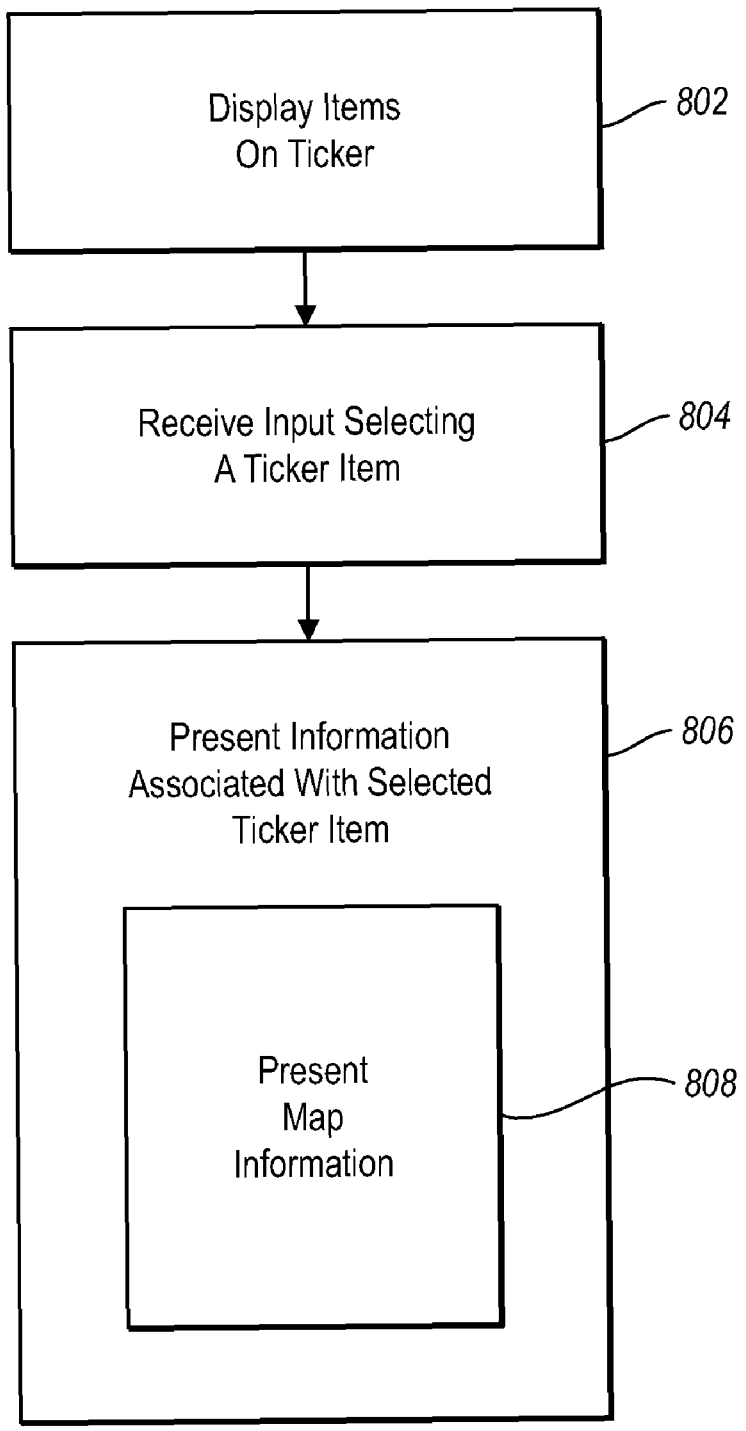
FIG. 8 is a flow chart illustrating aspects of presenting a location-based map on a display of a communication device.

FIG. 8 illustrates an exemplary method for presenting or displaying location-based content including a map on a display of a communication device. After the scheduler determines which content to present and in what order, as discussed in FIG. 7, the ticker items are displayed at stage 802 on the display of the device. As previously stated, the ticker items may scroll in the ticker, giving the user an opportunity to view several ticker items as the ticker scrolls.

At stage 804, the device receives input from the user selecting a particular ticker item. The selection of the particular ticker item is achieved using various navigational aspects of the device such as the keypad, soft keys, and the like. After a ticker item is selected, information associated with the selected ticker item is presented to the user at stage 806. The information can include, as previously stated, a coupon, directions to a location associated with the selected ticker item, a more detailed advertisement, a description of the ticker item, and the like or any combination thereof.

Presenting information associated with a ticker item may also include displaying a map or map information at stage 808. In one example, the location of the device is used to access or request a map that corresponds to an area surrounding the device. The map scale can vary and can depend on where the location associated with the selected content is located with respect to the communication device. The map can be retrieved from the ticker server or from a mapping service at another server or from another bearer (see, for example, FIG. 1 for bearers that may provide map information).

In one embodiment, the information associated with the selected ticker item includes a destination location. The destination location can identify a location of a content provider or other entity associated with the selected content of the ticker item. The destination location, along with the current location of the device can be provided to the ticker server or other map server such that the map ultimately returned to the device and displayed to the user includes markers illustrating both the location of the device and of the destination location associated with the ticker item. Displaying both markers helps the user identify the location associated with the selected ticker item more easily. If both locations are provided to the ticker server, then the map provided to the device can include a trace that maps a path between the current location of the device and the destination location. The request for a map can include the current location of the communication device, the destination device, or both.

Presenting a map to the user on the display of the communication device is one example of a secondary action that occurs when a ticker item is selected. In one example, the presentation of a map can be achieved with a single click of the ticker item, although the user may also be given the opportunity to view a map after viewing other information associated with the selected ticker item.

The map may be based at least on a current location of the device which can be identified using, by way of example, a GPS system, a proximity to transmitters in a wireless network, and user input. The current location may also be known to the ticker or mapping server without input from the communication device. The content associated with a selected ticker item may also include a link. The link may include the destination location and can be used by the mapping service to generate the requested map. The user, after clicking the link, connects with the ticker server (or with a mapping server) over an appropriate network and receives the map that includes the destination location associated with the selected ticker item or content. When the user clicks on the link or on the ticker item, the location of the device is either determined or collected from the device itself or from the ticker server, for example.

As previously stated, the current location of the communication device may already be known. Thus, a map can be pre-generated based on the current location. This map can be updated over time such that it is continually ready for transmission to the communication device upon receiving the appropriate request. The destination location can optionally be incorporated when known in this case.

VI. Telecommunication Devices and Computing Environments

Embodiments of the present invention may be implemented in connection with a special purpose or general purpose telecommunications device, including wireless telephones and other telephony-enabled mobile devices, landline telephones, or special purpose or general purpose computers that are adapted to have telecommunications or data networking capabilities such as cable set top boxes or PCs. Embodiments within the scope of the present invention also include computer-readable media for carrying or having computer-executable instructions or electronic content structures stored thereon, and these terms are defined to extend to any such media or instructions that are used with telecommunications devices.

By way of example, and not limitation, such computer-readable media can comprise RAM, ROM, EEPROM, CD-ROM or other optical disk storage, magnetic disk storage or other magnetic storage devices, or any other medium which can be used to carry or store desired program code in the form of computer-executable instructions or electronic content structures and which can be accessed by a general purpose or special purpose computer, or other computing device.

When information is transferred or provided over a network or another communications connection (either hardwired, wireless, or a combination of hardwired or wireless) to a computer or computing device, the computer or computing device properly views the connection as a computer-readable medium. Thus, any such connection is properly termed a computer-readable medium. Combinations of the above should also be included within the scope of computer-readable media. Computer-executable instructions comprise, for example, instructions and content which cause a general purpose computer, special purpose computer, special purpose processing device or computing device to perform a certain function or group of functions.

Although not required, aspects of the invention have been described herein in the general context of computer-executable instructions, such as program modules, being executed by computers in network environments. Generally, program modules include routines, programs, objects, components, and content structures that perform particular tasks or implement particular abstract content types. Computer-executable instructions, associated content structures, and program modules represent examples of program code for executing aspects of the methods disclosed herein.

The described embodiments are to be considered in all respects only as exemplary and not restrictive. The scope of the invention is, therefore, indicated by the appended claims rather than by the foregoing description. All changes which come within the meaning and range of equivalency of the claims are to be embraced within their scope.

What is claimed is:

1. A system comprising:
   a handheld wireless telecommunication device that includes a display device, the handheld wireless telecommunication device being configured to:
      receive a plurality of content items aggregated from the plurality of content providers, each content item of the plurality of content items including an individually associated uniform resource identifier (URI) that indicates a destination location;
      present, in a scrolling user interface on the display device of the handheld wireless telecommunication device, the plurality of content items;
      receive input from a user that selects a portion of a first content item of the plurality of content items presented in the scrolling user interface on the display device of the handheld wireless telecommunication device; and
      in response to the user selection of the portion of the first content item presented in the scrolling user interface on the display device of the handheld wireless telecommunication device:
         use the individually associated URI of the first content item to request a map that includes the destination location indicated by the individually associated URI of the first content item;
         receive the requested map that includes the destination location indicated by the individually associated URI of the first content item; and
         display the requested map that includes the destination location indicated by the individually associated URI of the first content item.

2. The system as in claim 1, wherein the handheld wireless telecommunication device is configured to receive the plurality of content items pursuant to subscriptions to the plurality of content providers.

3. The system as in claim 2, wherein the scrolling user interface, in which the plurality of content items received pursuant to the subscriptions to the plurality of content providers are presented, is a ticker.

4. The system as in claim 1, wherein the scrolling user interface, in which the plurality of content items are presented, is a ticker.

5. The system as in claim 1, wherein the handheld wireless telecommunication device is further configured to, in response to the user selection of the portion of the first content item presented in the scrolling user interface on the display device of the handheld wireless telecommunication device:
send a location of the handheld wireless telecommunication device to request the map;
wherein the map includes:
the location of the handheld wireless telecommunication device; and
the destination location indicated by the individually associated URI of the first content item.

6. The system as in claim 1, wherein the handheld wireless telecommunication device is further configured to present, in the scrolling user interface, one or more additional content items.

7. The system as in claim 6, wherein each of the one or more additional content items includes an individually associated uniform resource identifier (URI) that indicates a destination location.

8. A system comprising:
a handheld wireless telecommunication device that includes a display device, the handheld wireless telecommunication device being configured to:
receive a plurality of content items aggregated from the plurality of content providers, each content item of the plurality of content items including an individually associated hyperlink that indicates a destination location;
present, in a scrolling user interface on the display device of the handheld wireless telecommunication device, the plurality of content items;
receive input from a user that selects the individually associated hyperlink of a first content item of the plurality of content items presented in the scrolling user interface on the display device of the handheld wireless telecommunication device; and
in response to the user selection of the individually associated hyperlink of the first content item presented in the scrolling user interface on the display device of the handheld wireless telecommunication device:
request a map that includes the destination location indicated by the individually associated hyperlink of the first content item;
receive the requested map that includes the destination location indicated by the individually associated hyperlink of the first content item; and
display the requested map that includes the destination location indicated by the individually associated hyperlink of the first content item.

9. The system as in claim 8, wherein the handheld wireless telecommunication device is configured to receive the plurality of content items pursuant to subscriptions to the plurality of content providers.

10. The system as in claim 9, wherein the scrolling user interface, in which the plurality of content items received pursuant to the subscriptions to the plurality of content providers are presented, is a ticker.

11. The system as in claim 8, wherein the scrolling user interface, in which the plurality of content items are presented, is a ticker.

12. The system as in claim 8, wherein the handheld wireless telecommunication device is further configured to, in response to the user selection of the individually associated hyperlink of the first content item presented in the scrolling user interface on the display device of the handheld wireless telecommunication device:
send a location of the handheld wireless telecommunication device to request the map;
wherein the map includes:
the location of the handheld wireless telecommunication device; and
the destination location indicated by the individually associated hyperlink of the first content item.

13. The system as in claim 8, wherein the handheld wireless telecommunication device is further configured to present, in the scrolling user interface, one or more additional content items.

14. The system as in claim 13, wherein each of the one or more additional content items includes an individually associated hyperlink that indicates a destination location.

15. A method comprising:
by a handheld wireless telecommunication device that includes a display device:
receiving a plurality of content items aggregated from the plurality of content providers, each content item of the plurality of content items including an individually associated uniform resource identifier (URI) that indicates a destination location;
presenting, in a scrolling user interface on the display device of the handheld wireless telecommunication device, the plurality of content items;
receiving input from a user that selects a portion of a first content item of the plurality of content items presented in the scrolling user interface on the display device of the handheld wireless telecommunication device; and
in response to the user selection of the portion of the first content item presented in the scrolling user interface on the display device of the handheld wireless telecommunication device:
using the individually associated URI of the first content item to request a map that includes the destination location indicated by the individually associated URI of the first content item;
receiving the requested map that includes the destination location indicated by the individually associated URI of the first content item; and
displaying the requested map that includes the destination location indicated by the individually associated URI of the first content item.

16. The method as in claim 15, wherein the act of receiving a plurality of content items aggregated from a plurality of content providers comprises:
receiving, pursuant to subscriptions to the plurality of content providers, the plurality of content items aggregated from the plurality of content providers.

17. The method as in claim 16, wherein the scrolling user interface, in which the plurality of content items received pursuant to the subscriptions to the plurality of feeds are presented, is a ticker.

18. The method as in claim 15, wherein the scrolling user interface, in which the plurality of content items are presented, is a ticker.

19. The method as in claim 15, further comprising:
in further response to the user selection of the portion of the first content item presented in the scrolling user interface on the display device of the handheld wireless telecommunication device:
sending a location of the handheld wireless telecommunication device to request the map;
wherein the map includes:
the location of the handheld wireless telecommunication device; and
the destination location indicated by the individually associated URI of the first content item.

20. The method as in claim 15, further comprising presenting, in the scrolling user interface, one or more additional content items.

21. The method as in claim 20, wherein each of the one or more additional content items includes an individually associated uniform resource identifier (URI) that indicates a destination location.

22. A method comprising:
by a handheld wireless telecommunication device that includes a display device:
receiving a plurality of content items aggregated from the plurality of content providers, each content item of the plurality of content items including an individually associated hyperlink that indicates a destination location;
presenting, in a scrolling user interface on the display device of the handheld wireless telecommunication device, the plurality of content items;
receiving input from a user that selects the individually associated hyperlink of a first content item of the plurality of content items presented in the scrolling user interface on the display device of the handheld wireless telecommunication device; and
in response to the user selection of the individually associated hyperlink of the first content item presented in the scrolling user interface on the display device of the handheld wireless telecommunication device:
requesting a map that includes the destination location indicated by the individually associated hyperlink of the first content item;
receiving the requested map that includes the destination location indicated by the individually associated hyperlink of the first content item; and
displaying the requested map that includes the destination location indicated by the individually associated hyperlink of the first content item.

23. The method as in claim 22, wherein the act of receiving a plurality of content items aggregated from a plurality of content providers comprises:
receiving, pursuant to subscriptions to the plurality of content providers, the plurality of content items aggregated from the plurality of content providers.

24. The method as in claim 23, wherein the scrolling user interface, in which the plurality of content items received pursuant to the subscriptions to the plurality of feeds are presented, is a ticker.

25. The method as in claim 22, wherein the scrolling user interface, in which the plurality of content items are presented, is a ticker.

26. The method as in claim 22, further comprising:
in further response to the user selection of the individually associated hyperlink of the first content item presented in the scrolling user interface on the display device of the handheld wireless telecommunication device:
sending a location of the handheld wireless telecommunication device to request the map;
wherein the map includes:
the location of the handheld wireless telecommunication device; and
the destination location indicated by the individually associated hyperlink of the first content item.

27. The method as in claim 22, further comprising presenting, in the scrolling user interface, one or more additional content items.

28. The method as in claim 27, wherein each of the one or more additional content items includes an individually associated hyperlink that indicates a destination location.

* * * * *